United States Patent [19]

Lorenz

[11] 4,002,443
[45] Jan. 11, 1977

[54] AIR FILTER CLAMPING MECHANISM FOR CAB

[75] Inventor: Leo J. Lorenz, Farmington, Mich.

[73] Assignee: Massey-Ferguson Inc., Detroit, Mich.

[22] Filed: Mar. 31, 1975

[21] Appl. No.: 563,942

[52] U.S. Cl. ............................ 55/357; 55/422; 55/493; 55/504; 55/507; 55/509
[51] Int. Cl.² ............................... B01D 46/00
[58] Field of Search ........... 55/357, 422, 493, 501, 55/502, 504, 507, 509, 480, 481

[56] References Cited

UNITED STATES PATENTS

| | | | |
|---|---|---|---|
| 3,383,841 | 5/1968 | Olson et al. | 55/502 X |
| 3,393,498 | 7/1968 | Schoen | 55/501 X |
| 3,423,908 | 1/1969 | Hart | 55/509 X |
| 3,507,100 | 4/1970 | Neumann | 55/502 |
| 3,593,503 | 7/1971 | Andrews | 55/493 X |
| 3,630,008 | 12/1971 | Revell et al. | 55/502 X |
| 3,745,753 | 7/1973 | Risse | 55/502 X |
| 3,816,984 | 6/1974 | Neumann | 55/481 X |

FOREIGN PATENTS OR APPLICATIONS

| | | | |
|---|---|---|---|
| 140,699 | 12/1948 | Australia | 55/493 |
| 1,318,773 | 5/1973 | United Kingdom | 55/481 |

Primary Examiner—Frank W. Lutter
Assistant Examiner—Kathleen J. Prunner
Attorney, Agent, or Firm—Robert L. Farris

[57] ABSTRACT

This specification describes a mechanism for clamping an air filter in a vehicle by a floating lever which is actuated by a cranked rod, spring mounted on the vehicle. The spring exerts a clamping force against filter and floating lever ensures force is evenly applied.

7 Claims, 3 Drawing Figures

AIR FILTER CLAMPING MECHANISM FOR CAB

This invention relates to filter installations, particularly though not exclusively, for filtering air induced into passenger compartment of vehicles.

It is important to ensure that all the air passing into such a compartment passes through the filter and thus there are no gaps between such filter and its support. Where the structure is fabricated, it is possible that parts of it are misaligned so that planar support surfaces for a filter are not true and parallel. Thus, it is desirable that the filter mounting means accommodate misalignment. Further, since the filter requires periodic attention, it is desirable that the element be readily removable. Failure to make it so would lead to neglect of the filter. The filter element, however, must be firmly secured in the supporting structure, especially when used in vehicles and the clamping device securing the element must be simple yet robust.

The present invention provides a filter assembly wherein the filter element is held in position by a floating lever arrangement which can accommodate misalignment of parts of the supporting structure. The floating lever arrangement is moved into and out of filter clamping position by a cranked rod which is preferably resiliently mounted to apply a seating force to the filter element. The cranked rod is arranged so that it passes overcenter in respect to a resilient biasing means when moving into the clamping position.

Further, a device is provided to ensure that the filter element is offered up to the supporting structure in such a way as to facilitate sealing between the filter and the supporting structure. The device tilts the floating lever about the cranked rod so that one edge of the filter element engages the supporting structure first.

An embodiment of the present invention will now be described by way of example only with reference to the accompanying drawings, in which.

Figure 1:
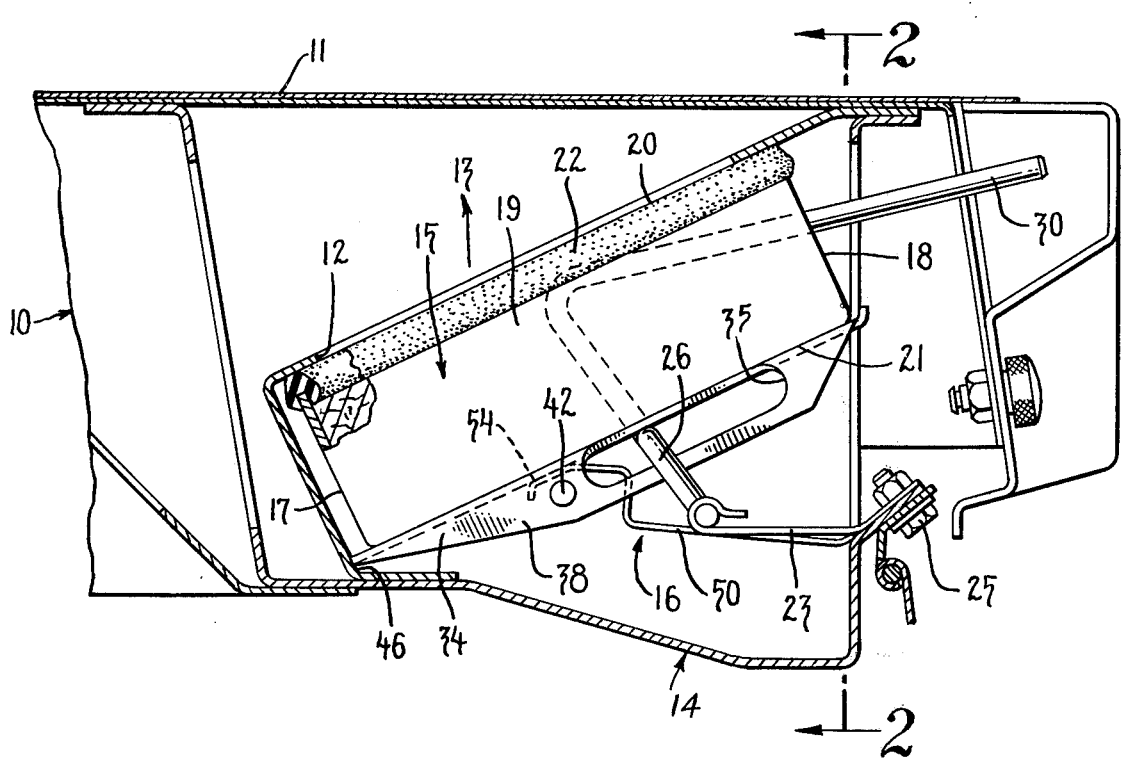
FIG. 1 is a sectional view in elevation of a portion of a tractor operator's compartment showing a filtering element for an air conditioning unit.

Referring now to FIG. 1, a tractor 10 is provided with a cab 11 having an air inlet aperture 12 through which air flows in the direction indicated by arrow 13. A filter housing 14 is provided in the tractor cab 11. The inlet aperture 12 is formed in the filter housing 14. A filter element 15 covers the air inlet aperture 12 and is secured within the filter housing 14 by a clamping assembly 16.

The filter element 15 is provided with front wall 17, rear wall 18, and side walls 19 which are solid and permeable top and bottom surfaces 20, 21, respectively, and a core of known construction suitable for filtering dirt out of air passing through it.

A resilient sealing strip 22 is attached to the upper periphery of the walls 17, 18 and 19 and cooperates with the filter housing 14 to provide an airtight seal around the air inlet aperture 12.

The clamping assemby 16 includes a pair of blade springs 23, 24 which are secured to the cab 11 by bolts 25. The free ends of the blade springs 23, 24 pivotally encompass outer end portions 27, 28 of a cranked rod 26. The cranked rod 26 includes an intermediate portion 29 which is offset and in parallel relation with its axially aligned end portions 27, 28. A handle 30 extends integrally from end portion 28. The central or intermediate portion 29 of the rod passes through a pair of floating levers 34, 36 and above a cranked resilient strap 50. The levers are channel-shaped in cross-section having downwardly depending flanges 38 with elongated slots 35, 37 therein to receive the intermediate portion 29 of the cranked rod 26. In order to maintain the levers 34, 36 in spaced parallel relation, the flanges 38 are suitably interconnected by a rod 42 which is fixed axially with respect to the flanges by pins 48. The forward portions of the flanges 38 are shown tapered to enable both ends 43, 44 of the levers 34, 36 to rest against a sloping abutment 46 formed by the filter housing 14. The opposite ends 47 and 48 of levers 34 and 36 are upturned to restrain the filter element 15.

Resilient strap 50 is secured at one end to the filter housing 14 in the tractor cab 11 by a bolt 52 and has a hooked portion 54 at the other end which passes over the central portion of the rod 42.

With the filter element 15 locked in its operative position shown in FIG. 1, the central bottom surface 21 of the filter element 15 abuts and rests on the top surfaces of the levers 34, 36. The aforementioned spring blades 23, 24, FIG. 3, through cranked rod 26, urge the levers 34, 36, and the filter 15 supported thereon into firm contact with the filter housing 14. The top edges of the walls of the filter element 15 thus press tightly to deform the resilient sealing strip 22 and preclude air flow between the top edges of its walls and the margins of the filter housing 14 defining aperture 12 therein.

Figure 2:
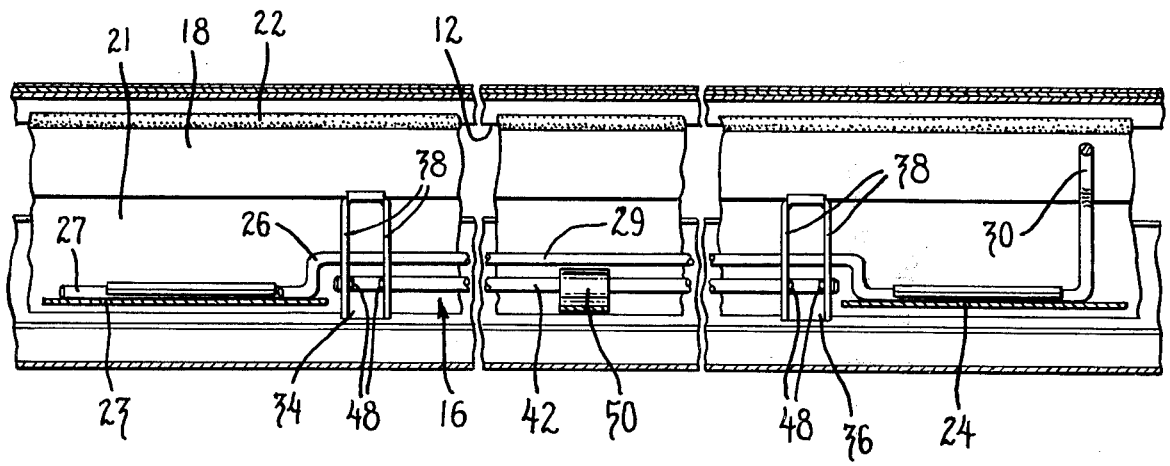
FIG. 2 is a section taken along the line 2 — 2 of FIG. 1.

To release the filter element 15 from the clamped position shown in FIGS. 1 and 2, the handle 30 is rotated clockwise to turn the cranked rod 26 in the blade springs 23, 24 and allow the floating levers 34, 36 to move toward the lower surface of the filter housing 14. This requires moving cranked rod 26 overcenter with respect to the blade springs 23, 24. The resilient strap 50 guides the end of the floating levers 34, 36 down the sloping abutment 46 and allows the filter element 15 to move away from the air inlet aperture 12 for removal rearwardly from the filter housing 14.

To replace the filter element 15, it is placed on the strap 50 above the floating levers 34, 36 with the handle 30 rotated fully clockwise as viewed in FIG. 1. The handle 30 is then rotated anti-clockwise which rotates the cranked rod 26 and moves the floating levers 34, 36 up toward the air inlet aperature 12. The ends 43, 44 of floating levers 34 and 36 make contact with the sloping abutment 46 to position the floating levers 34 and 36 and thus permit secure clamping action. The upturned ends 47 and 48 of the floating levers 34 and 36 insure that the filter element 15 moves forward when the floating levers move forward and into contact with the sloping abutment 46.

When the levers 34, 36 contact the filter, it is pressed against the housing 14 and continued movement of the handle 30 causes the blade springs 23, 24 to flex and allow the cranked rod 26 to overcenter, thus locking the mechanism. The force from the blade springs 23, 24 ensures that the resilient sealing strip 22 is firmly pressed against the filter housing 14 to provide an airtight seal. Strap 50 is dimensioned and positioned such that it cooperates with rod 42 which extends between the levers 34, 36 to restrict upward rotational movement of the forward ends of the levers. Strap 50 also forms a support for initially positioning the filter element.

Figure 3:
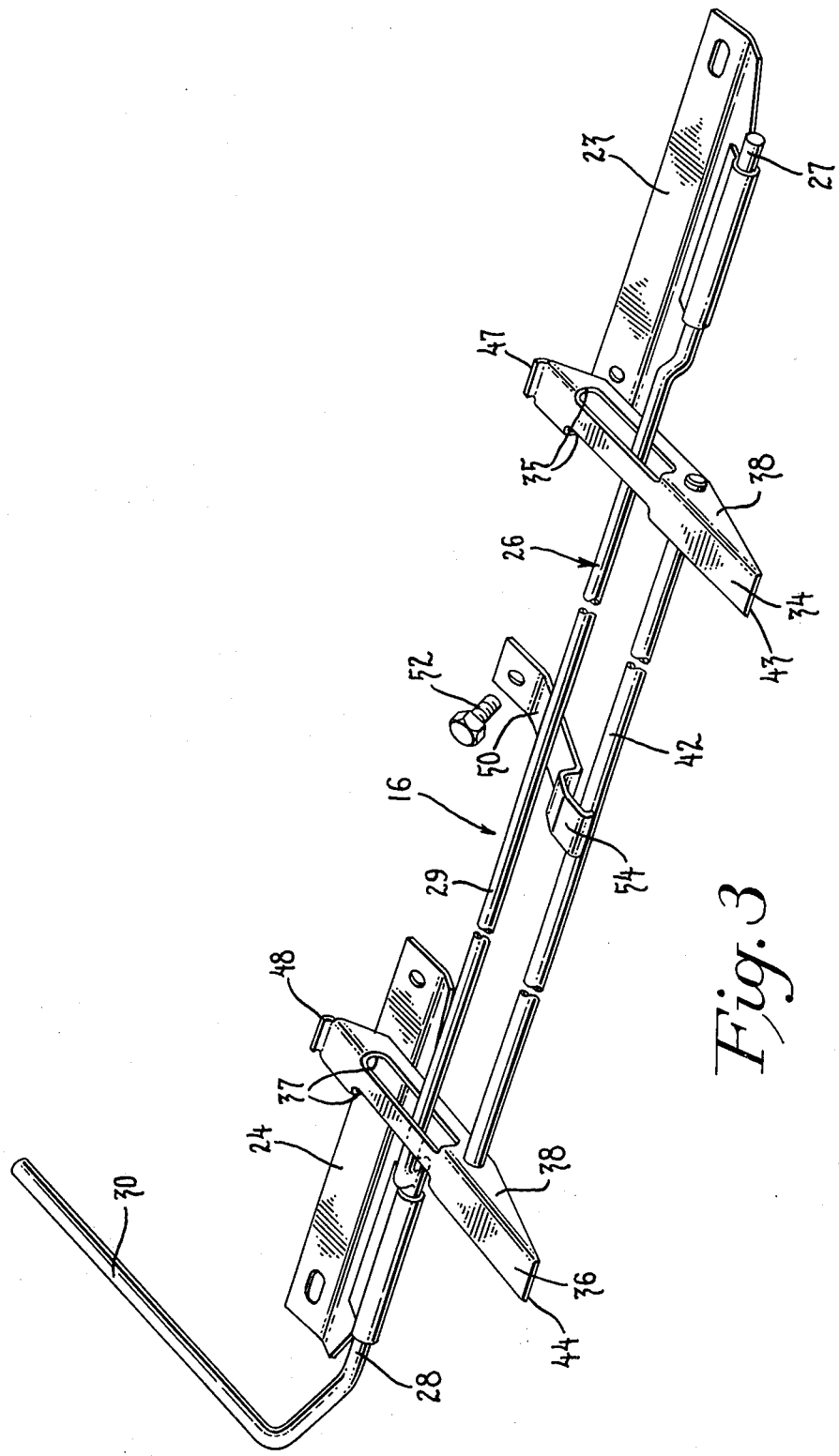
FIG. 3 is a front perspective view of the clamping assembly shown in FIGS. 1 and 2.

Since levers 34, 36, FIG. 3, are interconnected by means of rod 42 to constitute a support frame for the filter element 15, the levers may accommodate slight differential rotation about the shaft 42 relative to each other. The elongated slots enable the frame to float in a fore and aft direction so that front ends 43, 44 abut the sloping wall 46 of the housing. The support frame may also float a slight amount longitudinally of the central portion 29 of the cranked rod. In addition, the blade springs 23 and 24 enable slight differential pivotal action at opposite ends of the cranked rod 26. From the foregoing, it is seen that small deviations in structure may be accommodated while insuring that the filter element is firmly seated against the margins of the aperture of the housing. Further, the mechanism is simple and robust.

What I claim is:

1. An air filter installation including a filter housing, an air inlet aperture in the filter housing, a filter element covering the air inlet aperture in the filter housing and a clamping assembly for clamping the filter element in position in the filter housing, said clamping assembly including at least one blade spring with one end rigidly attached to the filter housing and a free end, at least one floating lever engagable with the filter element, a slot in the floating lever and a cranked rod rotatably attached to the free end of the blade spring and having a portion remote from said blade spring passing through said slot in the floating lever for biasing the floating lever toward the filter element and biasing the filter element toward the air inlet aperture.

2. The air filter installation of claim 1 wherein the clamping assembly includes a plurality of floating levers engagable with the filter element and connecting rod means pivotally interconnecting the floating levers.

3. The air filter installation of claim 2 wherein each of the floating levers includes a slot and the cranked rod rotatably attached to the free end of the blade spring passes through the slot in each of the floating levers.

4. The air filter installation of claim 1 wherein said clamping assembly includes a plurality of blade springs each of which has one end rigidly attached to the filter housing and a free end that rotatably supports the cranked rod.

5. The air filter installation of claim 1 wherein the cranked rod of the clamping assembly includes a handle portion for rotating the cranked rod relative to the blade spring.

6. The air filter installation of claim 1 wherein the filter housing includes a sloping abutment and the floating lever of the clamping assembly includes an end engagable with the sloping abutment of the filter housing to limit movement of the floating lever.

7. The air filter installation of claim 1 wherein the floating lever of the clamping assembly includes an upturned end for restraining the filter element.

* * * * *